(12) United States Patent
Yoshida

(10) Patent No.: US 9,838,625 B2
(45) Date of Patent: Dec. 5, 2017

(54) IMAGE PROCESSING APPARATUS AND CONTROL METHOD FOR IMAGE PROCESSING APPARATUS FOR CONTROLLING CORRECTION OF A BLACK LEVEL IN A COMBINED IMAGE SIGNAL

(71) Applicant: CANON KABUSHIKI KAISHA, Tokyo (JP)

(72) Inventor: Akimitsu Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/291,495

(22) Filed: Oct. 12, 2016

(65) Prior Publication Data

US 2017/0034461 A1 Feb. 2, 2017

Related U.S. Application Data

(63) Continuation of application No. 13/543,326, filed on Jul. 6, 2012, now Pat. No. 9,491,381.

(30) Foreign Application Priority Data

Jul. 11, 2011 (JP) .................................. 2011-152960

(51) Int. Cl.
- H04N 5/361 (2011.01)
- H04N 5/355 (2011.01)
- H04N 5/235 (2006.01)
- H04N 9/73 (2006.01)

(52) U.S. Cl.
CPC ........... *H04N 5/361* (2013.01); *H04N 5/2352* (2013.01); *H04N 5/35536* (2013.01); *H04N 5/35581* (2013.01); *H04N 9/735* (2013.01)

(58) Field of Classification Search
CPC . H04N 5/35536; H04N 5/35581; H04N 5/361
See application file for complete search history.

(56) References Cited

U.S. PATENT DOCUMENTS

| 8,081,220 B2* | 12/2011 | Kawai | H04N 5/23248 348/208.1 |
| 8,212,895 B2* | 7/2012 | Nakamura | H04N 5/23232 348/239 |
| 2001/0019362 A1* | 9/2001 | Nakamura | H04N 1/212 348/222.1 |
| 2003/0048363 A1* | 3/2003 | Watanabe | H04N 5/235 348/222.1 |

(Continued)

FOREIGN PATENT DOCUMENTS

| JP | 2004-222161 A | 8/2004 |
| JP | 2005-086228 A | 3/2005 |
| WO | 2008/153085 A1 | 12/2008 |

*Primary Examiner* — Amy Hsu
(74) *Attorney, Agent, or Firm* — Canon USA, Inc. I.P. Division

(57) ABSTRACT

An image capture apparatus includes an image capture unit, a first correction unit configured to correct a black level of an image signal output from the image capture unit, a combining unit configured to select pixels to be used from among a plurality of image signals, the black level of which has been corrected by the first correction unit, to generate a combined image signal, and a second correction unit configured to correct the black level of the combined image signal generated by the combining unit.

12 Claims, 9 Drawing Sheets

(56) References Cited

U.S. PATENT DOCUMENTS

| | | | | |
|---|---|---|---|---|
| 2005/0094768 A1* | 5/2005 | Ghelmansarai | ........... | A61B 6/00 378/108 |
| 2007/0064117 A1* | 3/2007 | Nakai | ................... | H04N 9/045 348/222.1 |
| 2007/0147706 A1* | 6/2007 | Sasaki | ................ | H04N 5/23248 382/295 |
| 2007/0285526 A1* | 12/2007 | Mann | ................. | H04N 5/23245 348/222.1 |
| 2009/0009614 A1* | 1/2009 | Kawai | ............... | H04N 5/23248 348/208.12 |
| 2009/0040321 A1* | 2/2009 | Nakamura | ......... | H04N 5/23232 348/208.11 |
| 2009/0284618 A1* | 11/2009 | Kurahashi | .............. | H04N 5/235 348/229.1 |
| 2010/0053374 A1* | 3/2010 | Otsuki | ............... | H04N 5/23212 348/231.99 |
| 2010/0079628 A1* | 4/2010 | Oda | ....................... | H04N 5/367 348/243 |
| 2010/0182451 A1* | 7/2010 | Kita | .................... | H04N 5/2355 348/229.1 |
| 2011/0149111 A1* | 6/2011 | Prentice | ............. | H04N 5/23216 348/229.1 |
| 2012/0050557 A1* | 3/2012 | Atanassov | ......... | H04N 5/35581 348/222.1 |

* cited by examiner

FIG. 7

| | ISO 100 | | ISO 200 | | ... | ISO 3200 | | ... | ISO 25600 | |
| --- | --- | --- | --- | --- | --- | --- | --- | --- | --- | --- |
| | Tv<1sec | 1sec≤Tv | Tv<1sec | 1sec≤Tv | ... | Tv<1sec | 1sec≤Tv | ... | Tv<1sec | 1sec≤Tv |
| Temp.<45°C | × | × | × | × | ... | × | ○ | ... | ○ | ○ |
| 45°C≤Temp.<60°C | × | × | × | ○ | ... | × | ○ | ... | ○ | ○ |
| 60°C≤Temp. | × | ○ | × | ○ | ... | ○ | ○ | ... | ○ | ○ |

IMAGE PROCESSING APPARATUS AND CONTROL METHOD FOR IMAGE PROCESSING APPARATUS FOR CONTROLLING CORRECTION OF A BLACK LEVEL IN A COMBINED IMAGE SIGNAL

CROSS-REFERENCE TO RELATED APPLICATIONS

This application is a continuation, and claims the benefit, of U.S. patent application Ser. No. 13/543,326, presently pending and filed on Jul. 6, 2012, and claims the benefit of, and priority to, Japanese Patent Application No. 2011-152960 filed Jul. 11, 2011, which is hereby incorporated by reference herein in its entirety.

BACKGROUND OF THE INVENTION

Field of the Invention

The present invention relates to an image processing apparatus capable of performing multiple exposure shooting, and a control method for the image processing apparatus.

Description of the Related Art

Conventionally, a multiple exposure shooting apparatus has been discussed that performs various types of processing in addition to simple addition. For example, Japanese Patent Application Laid-Open No. 2003-69888 discusses a digital camera that realizes addition averaging processing by applying a gain according to the number of frames for multiple exposure shooting.

Japanese Patent Application Laid-Open No. 11-225308 discusses a multiple exposure shooting apparatus that, by switching arithmetic operation circuits, compares luminance values of pixels of two images to be combined so as to generate a combined image, in addition to performing the addition averaging processing.

However, the technique discussed in Japanese Patent Application Laid-Open No. 2003-69888 does not compare the luminance values to optimize processing for a multiple exposure shooting mode for combining the images as discussed in Japanese Patent Application Laid-Open No. 11-225308.

SUMMARY OF THE INVENTION

The present invention is directed to an image processing apparatus that performs processing appropriate for a multiple exposure shooting mode for comparing values of pixels to combine images, and to a control method for the image processing apparatus.

According to an aspect of the present invention, an image capture apparatus includes an image capture unit, a first correction unit configured to correct a black level of an image signal output from the image capture unit, a combining unit configured to select pixels to be used from among a plurality of image signals, the black level of which has been corrected by the first correction unit, to generate a combined image signal, and a second correction unit configured to correct the black level of the combined image signal generated by the combining unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates conditions of optical black (OB) clamping to be performed on a combined image according to the second exemplary embodiment.

DESCRIPTION OF THE EMBODIMENTS

Various exemplary embodiments, features, and aspects of the invention will be described in detail below with reference to the drawings.

Figure 1A:
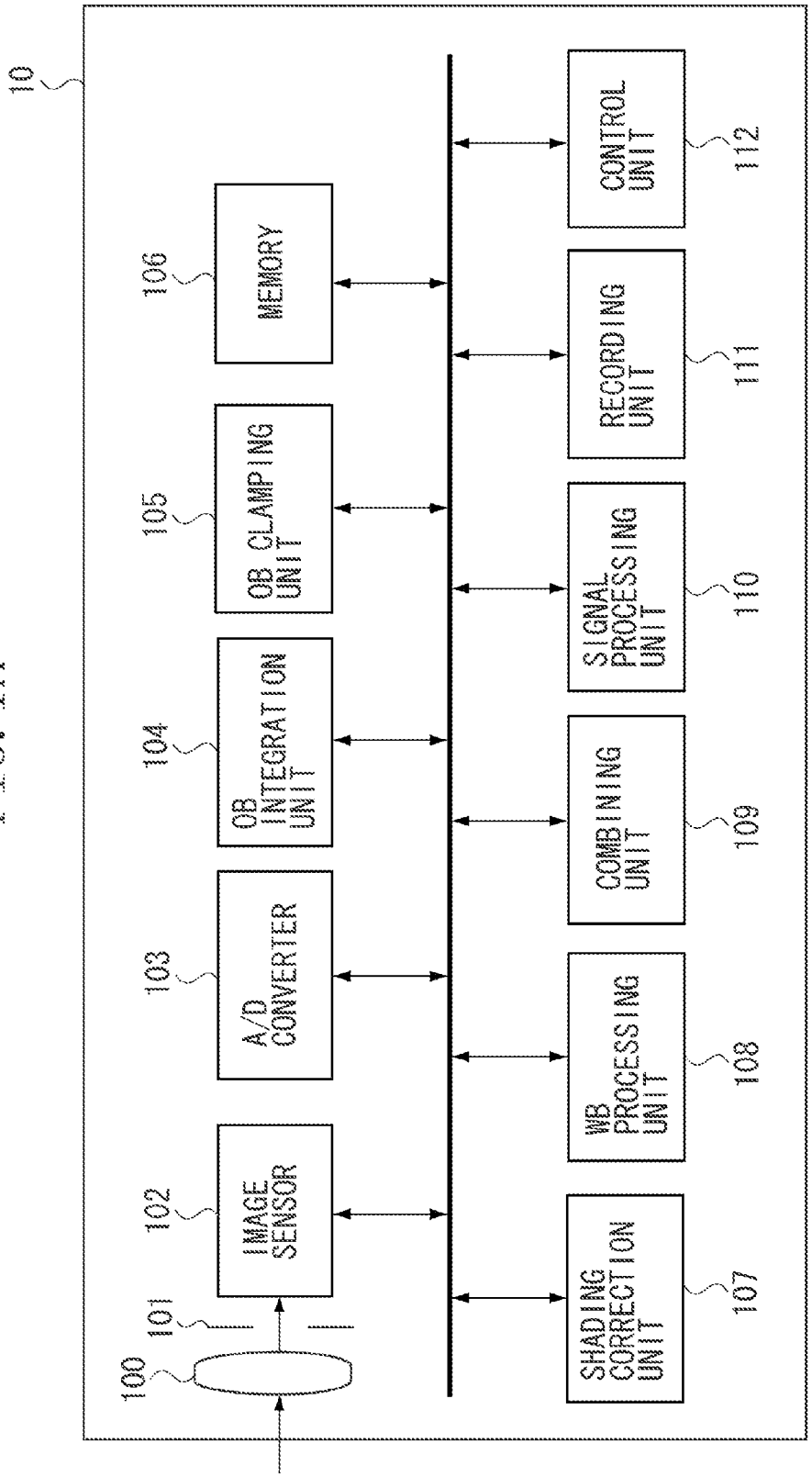
FIG. 1A is a block diagram of an image capture apparatus according to a first exemplary embodiment.

FIG. 1A illustrates an image capture apparatus 10 as an example of an image processing apparatus according to a first exemplary embodiment.

When a shutter switch SW2 (not illustrated) is pressed, a light beam that has entered a photographic lens 100 passes through a diaphragm 101, and then forms an object image on an image sensor 102. The image sensor 102 converts an optical image of the object image into an electric signal to generate an image signal.

Figure 1B:
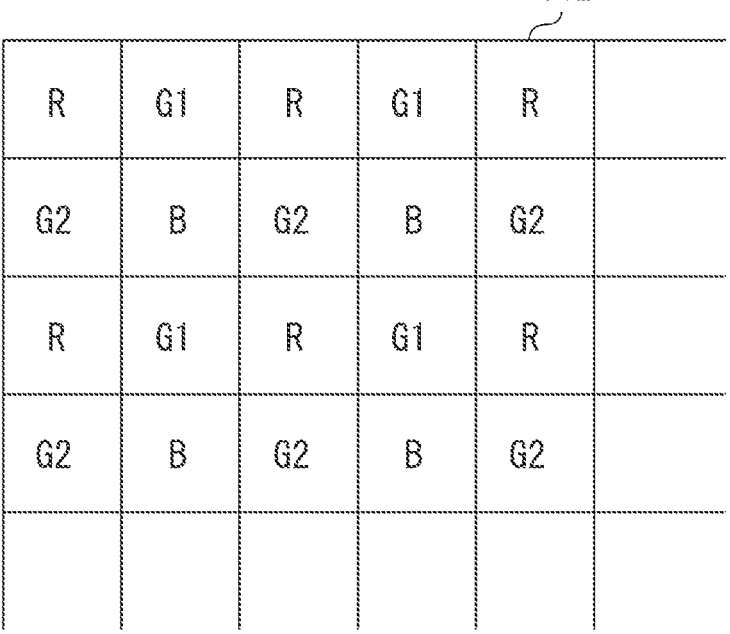
FIG. 1B illustrates the Bayer array of pixels of an image sensor.
Figure 3:
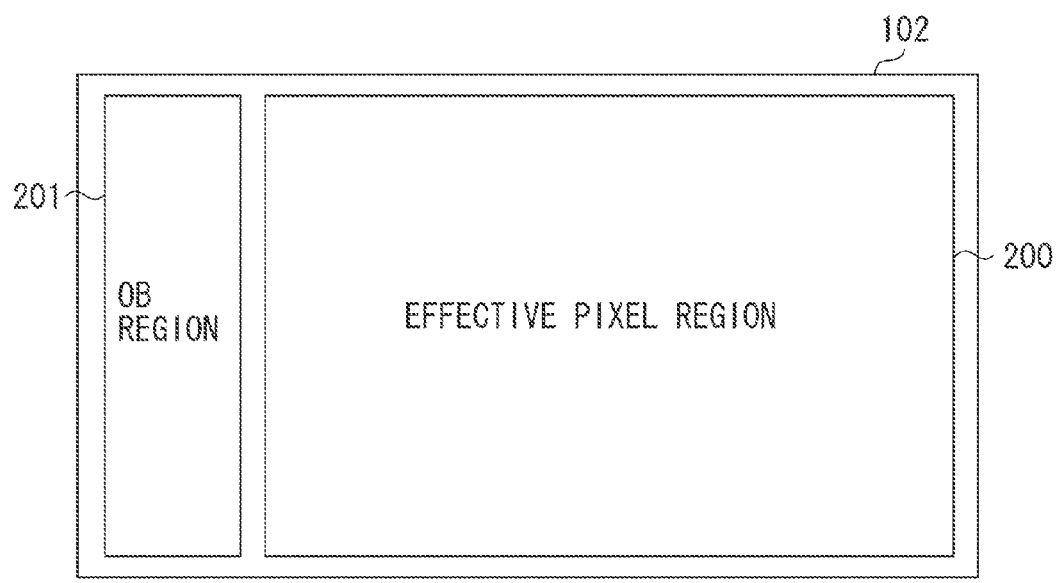
FIG. 3 schematically illustrates a pixel array arranged in an image sensor.

The image sensor 102 has a configuration of the Bayer array in which pixels of R, G1, G2, and B are regularly arranged as illustrated in FIG. 1B. An analog signal output from the image sensor 102 is converted into a digital signal (hereafter, referred to as "raw data") by an analog/digital (A/D) converter 103 and once stored in a memory 106. FIG. 3 schematically illustrates a pixel array arranged in the image sensor 102.

As illustrated in FIG. 3, the image sensor 102 includes an effective pixel region 200, where photodiodes, which are photoelectric conversion elements, is irradiated with light, and an optical black region (OB region) 201, where photodiodes in a predetermined region are blocked from light with an aluminum thin film.

An OB integration unit 104 integrates pixel values in the OB region 201 for each of R, G1, G2, and B of the Bayer array and outputs an average value of OB for each of R, G1, G2, and B. OB clamping, in which an output value of the OB integration unit 104 corresponding to a color of a pixel (R, G1, G2, B) of each pixel value as a dark level (black level) is subtracted from a pixel value of each pixel in the effective pixel region 200, is performed by an OB clamping unit 105. The OB clamping processing can prevent problems, such as washed-out black and color shift caused by, for example, dark current, from occurring.

The memory 106 stores the raw data and image data processed by a signal processing unit 110. A shading correction unit 107 corrects a luminance level in a screen of the raw data including digital image signals from the A/D conversion unit 103, to correct shading caused by characteristics of the photographic lens 100 and characteristics of the image sensor 102 such as aberration.

A white balance (WB) processing unit 108 performs WB processing, which is for adjusting white reference in the screen to white, on the image data output from the shading correction unit 107. According to the present exemplary embodiment, the shading correction applies a gain to each pixel according to a two-dimensional coordinate position in the image sensor 102, and the WB processing applies different gains to respective R, G1, G2, and B of the Bayer array.

A combining unit 109 performs various types of operations according to the respective multiple exposure shooting modes. According to the present exemplary embodiment, various types of operations are performed by the combining unit 109 according to each of four multiple exposure shooting modes, including an addition mode, averaging addition mode, bright remain mode, and dark remain mode. The combining unit 109 performs processing as described below in the present exemplary embodiment. The signal processing unit 110 performs development processing, such as color matrix processing and gamma processing, on the raw data and the raw data combined by the combining unit 109.

A recording unit 111 records the raw data and the raw data combined by the combining unit 109, and the image data on which development processing is performed by the signal processing unit 110. A control unit 112 performs overall control of the image capture apparatus 10.

Figure 2:
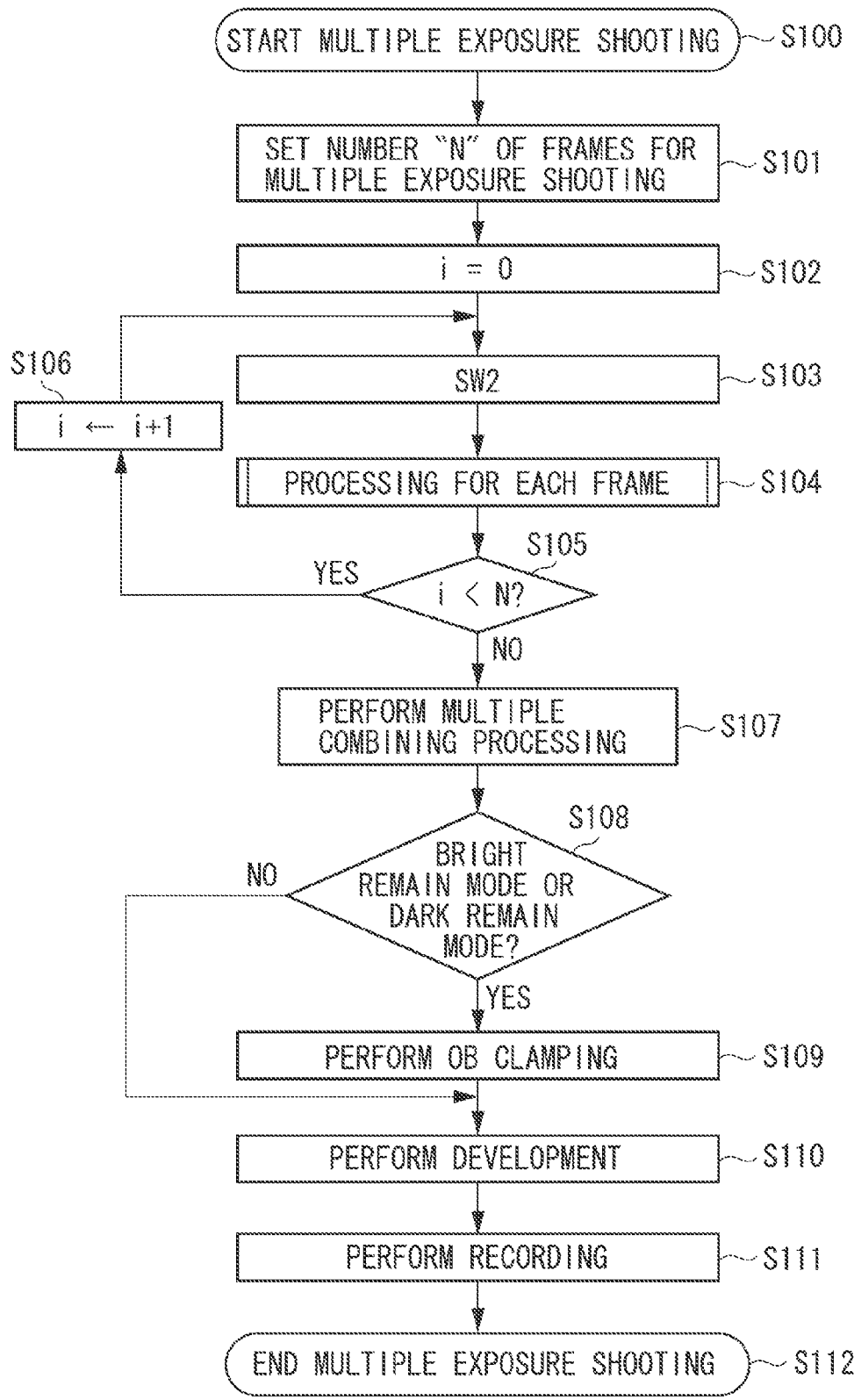
FIG. 2 illustrates a flow of multiple exposure shooting according to the first exemplary embodiment.

FIG. 2 illustrates a flow of multiple exposure shooting according to the present exemplary embodiment, which is in common among the various multiple exposure shooting modes (addition mode, addition averaging mode, bright remain mode, and dark remain mode) according to the present exemplary embodiment described above.

Figure 5:
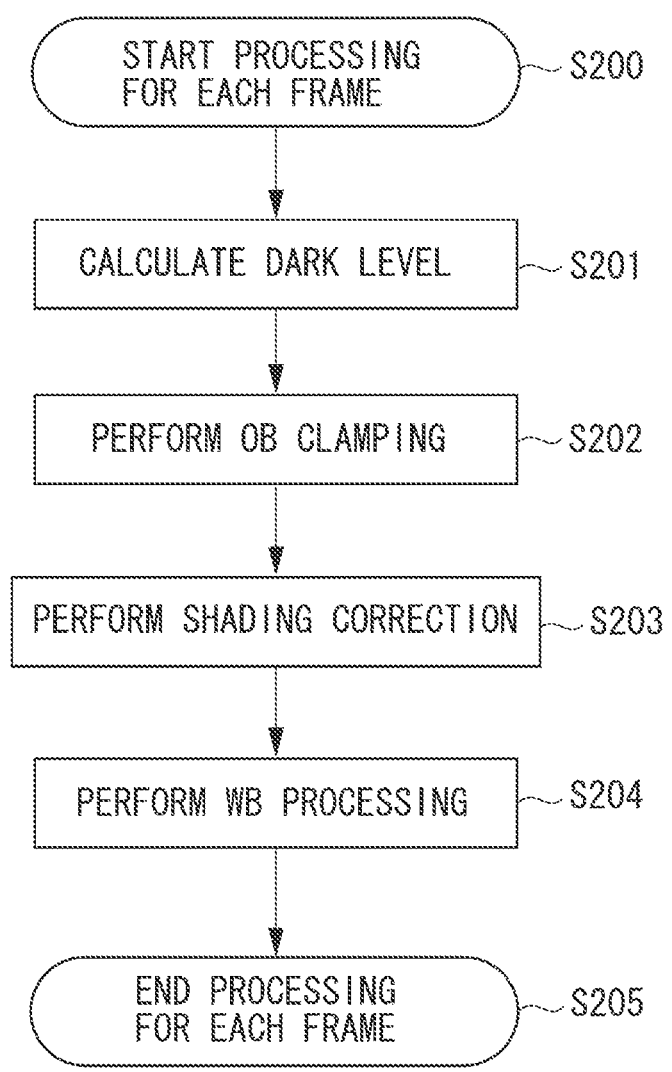
FIG. 5 illustrates a flow of processing performed on raw data that is not yet combined.

In step S100, the image capture apparatus 10 starts the multiple exposure shooting by user's operation and, in step S101, sets the number "N" of frames for multiple exposure shooting. In step S102, the control unit 112 initializes a variable "i" for controlling the number of frames to be shot. In step S103, the user presses the shutter switch SW2, and then in step S104, the image capture apparatus 10 performs processing on captured raw data. With reference to FIG. 5, the processing performed for each frame of the captured raw data will be described.

In step S200, when the processing for each frame of the raw data is started, then in step S201, the OB integration unit 104 calculates a dark level of the captured raw data (black level is calculated). In step S202, based on the calculated dark level, the OB clamping unit 105 performs the OB clamping, which is first correction. In step S203, the shading correction unit 107 corrects luminance shading and color shading in the screen.

In step S204, the WB processing unit 108 performs the WB processing for adjusting the signal level of each color component. In step S205, when the processing for each frame of the raw data is completed, then in step S105 (FIG. 2), the control unit 112 determines whether the number of shot frames reaches "N". When the number of shot frames reaches "N" (NO in step S105), the processing proceeds to combining processing in step S107. When the number of shot frames does not reach "N" (YES in step S105), then in step S106, the control unit 112 increments the variable "i" for controlling the number of frames to be shot, and the processing in steps S103 and S104 is repeated until the number of shot frames reaches "N".

The combining processing in each multiple exposure shooting mode in step S107 will be described. According to the present exemplary embodiment, each of four combining (blending) processing operations including the addition, addition averaging, bright remain, and dark remain can generate a combined image. Each pixel value of each image that is not yet combined is defined as I_i(x, y) (i=1 to N, "x" and "y" refer to coordinates in the screen), and the pixel value of the image acquired by combining "N" images is defined as I(x, y). The pixel value may be the value of each of R, G1, G2, and B signals in the Bayer array output from the WB processing unit 108, or may be the value of a luminance signal (luminance value) obtained from a group of R, G1, G2, and B signals. In addition, the signals in the Bayer array may be subjected to interpolation processing such that R, G, and B signals exist in each pixel, and the luminance value may be calculated in each pixel. An exemplary formula for calculating the luminance value includes calculating the luminance value Y by weighted-averaging the R, G, and B signals in such a manner that Y=0.3×R+0.59×G+0.11×B. Under such a definition, the addition mode is expressed by $$I(x,y)=I\_1(x,y)+I\_2(x,y)+ \ldots +I\_N(x,y).$$

The data on which the processing for adding the pixel values of "N" images is performed for each pixel becomes combined image data.

The addition averaging mode is expressed by $$I(x,y)=(I\_1(x,y)+I\_2(x,y)+ \ldots +I\_N(x,y))/N.$$

The data on which the processing for averaging the pixel values of "N" images is performed for each pixel becomes combined image data.

The bright remain mode is expressed by $$I(x,y)=\max(I\_1(x,y),I\_2(x,y), \ldots ,I\_N(x,y)).$$

The data in which the maximum value of the pixel values of "N" images is selected for each pixel becomes combined image data.

The dark remain mode is expressed by $$I(x,y)=\min(I\_1(x,y),I\_2(x,y), \ldots ,I\_N(x,y)).$$

The data in which the minimum value of the pixel values of "N" images is selected for each pixel becomes combined image data. In addition, in a case where the pixel value is a luminance value, as described above, in the bright remain mode or the dark remain mode, the values of R, G1, G2, and B signals compared and used to calculate the selected luminance value are selected as signal values of each pixel of the combined image data.

According to the present exemplary embodiment, the combining processing in each multiple exposure shooting mode described above is performed on both of the effective pixel region 200 and the OB region 201 illustrated in FIG. 3. More specifically, as the combined image on which the combining processing has been performed, the image data acquired by combining image data of the effective pixel regions 200 by each combining method and the image data acquired by combining image data of the OB region 201 by each combining method are generated. According to the present exemplary embodiment, the effective pixel region 200 and the OB region 201 are simultaneously processed as one piece of image data. However, the combining processing may be separately performed on each of the effective pixel region 200 and the OB region 201.

In step S107, when the combining processing is completed, then in step S108, the control unit 112 determines the multiple exposure shooting mode. When the mode is the addition mode or the addition averaging mode (NO in step S108), the processing proceeds to step S110. When the mode is the bright remain mode or the dark remain mode (YES in step S108), then in step S109, the OB integration unit 104 and the OB clamping unit 105 perform the OB clamping, which is a second correction, on the combined raw data.

As described above, according to the present exemplary embodiment, similarly to the image data corresponding to the effective pixel region 200 that is the image data to be viewed, the image data corresponding to the OB region 201 is also retained. The image processing similar to that performed on the effective pixel region 200 including the combining processing is performed on the image data corresponding to the OB region 201. Therefore, similar to the OB clamping processing performed for each frame of the image data in step S202, in step S109, the OB integration unit 104 calculates an average value of the OB (dark level) of the pixel in the OB region of the combined image, and then the OB clamping unit 105 performs the OB clamping thereon.

In step S110, the signal processing unit 110 performs developing processing, in step S111, the recording unit 111 records the image data on which the developing processing has been performed, and then in step S112, the image capture apparatus 10 completes the multiple exposure shooting.

Figure 4:
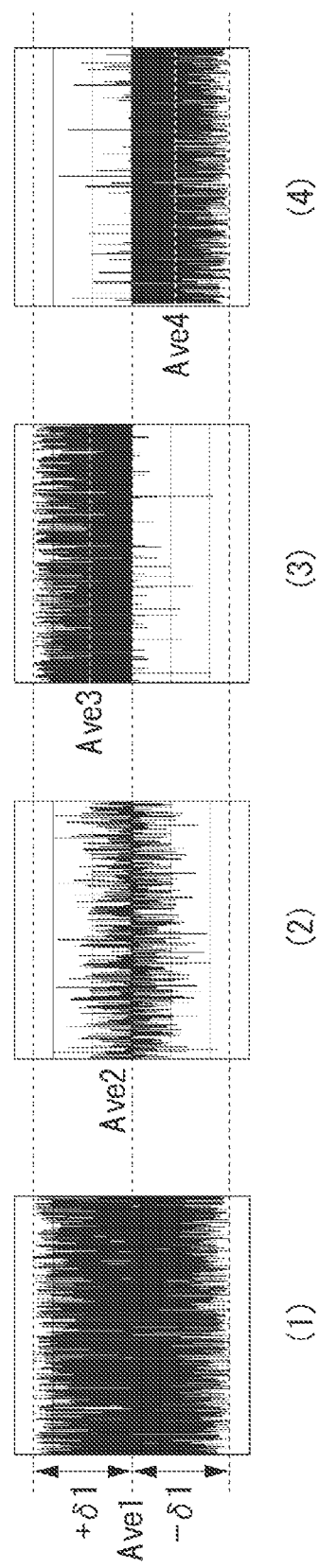
FIG. 4 schematically illustrates an amount of random noise in each multiple exposure shooting mode.

Reasons why the processing is varied depending on the multiple exposure shooting mode in steps S108 and S109 will be described below. FIG. 4 schematically illustrates an amount of random noise in each multiple exposure shooting mode. A graph (1) in FIG. 4 illustrates the amount of random noise of the image that is not yet combined. The random noise is distributed in an area of $\pm\delta1$ about an average value Ave1 in the vertical direction. A graph (2) in FIG. 4 illustrates the amount of random noise in the addition mode and the addition averaging mode.

Variation of the random noise of the image acquired by combining "N" images in the addition mode and the addition averaging mode decreases to $1/\sqrt{N}$ for one image that is not yet combined. However, an average value Ave2 of the random noise does not vary (Ave1=Ave2). Graphs (3) and (4) in FIG. 4 illustrate the amount of random noise in the bright remain mode and the dark remain mode, respectively. In the bright remain mode, since a larger pixel value is always selected for each pixel, the variation of the random noise is smaller. However, an average value Ave3 is larger for one image that is not yet combined (Ave1<Ave3).

On the other hand, in the dark remain mode, since a smaller pixel value is always selected for each pixel, an average value Ave4 of the random noise is smaller for one image that is not yet combined (Ave1>Ave4).

The dark level will be similarly described. Since the OB clamping is performed before the raw data is combined, the dark level of the raw data that is not yet combined is correctly corrected. In the addition mode and the addition averaging mode, since the dark level does not vary from that of the raw data that is not yet combined, there is no problem even if the OB clamping in step S109 is skipped. However, in the bright remain mode and the dark remain mode, since the dark level varies due to the random noise after the raw data is combined, the OB clamping needs to be performed to prevent washed-out black or a loss of shadow detail from occurring.

Figure 8:
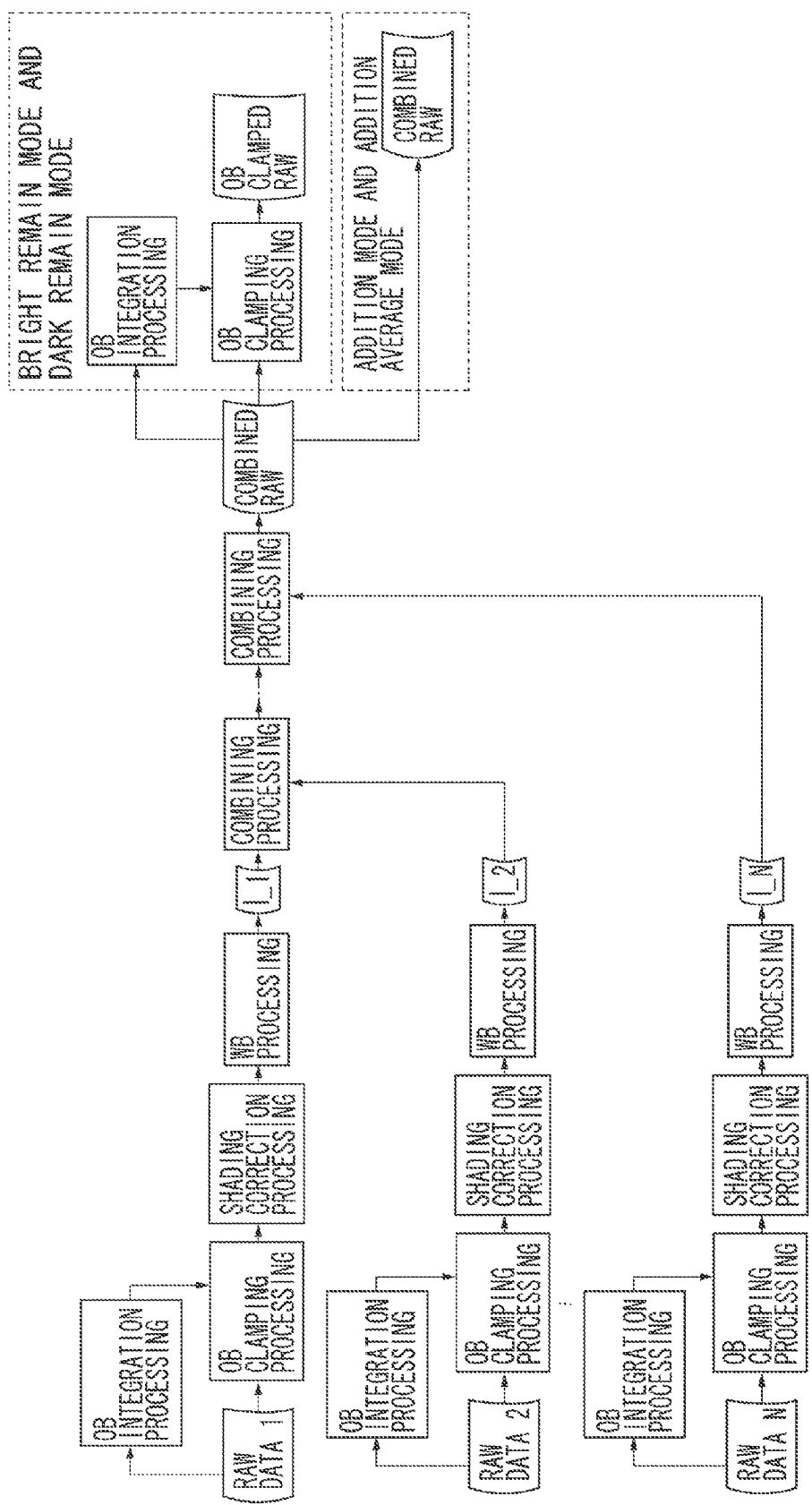
FIG. 8 is a block diagram illustrating a flow for combining the raw data.

Therefore, with the OB clamping performed in step S109, the dark level that varies can be corrected so that the combined image can have a desired image quality. FIG. 8 illustrates a data flow in the multiple exposure shooting according to the present exemplary embodiment.

The OB clamping processing is performed by the OB integration unit 104 and the OB clamping unit 105 on each captured raw data (raw data 1 to N) before it is combined. Further, the shading correction processing is performed by the shading correction unit 107, and the WB processing is performed by the WB processing unit 108.

A correction value for use in the shading correction unit 107 varies depending on shooting conditions, such as the diaphragm 101, International Organization for Standardization (ISO) sensitivity of the image sensor 102, and the exposure time. The gain for use in the WB processing unit also varies depending on an object when the WB mode or the auto white balance (AWB) setting is set for the image capture apparatus 10. Thus, the OB clamping needs to be performed on each raw data so that appropriate correction of the dark level can be performed thereon.

The combining processing according to each multiple exposure shooting mode is subsequently performed by the combining unit 109 on the image data (I_1 to I_N) on which up to the WB processing has been completed. More specifically, in the addition mode, the following equations are satisfied:

$$I2(x, y) = I\_1(x, y) + I\_2(x, y),$$

$$I3(x, y) = I2(x, y) + I\_3(x, y),$$

$$\ldots$$

$$I(x, y) = IN(x, y) = IN - 1(x, y) + I\_N(x, y)$$

Further, in the addition averaging mode, the following equations are satisfied:

$$I2(x, y) = (I\_1(x, y) + I\_2(x, y))/2,$$

$$I3(x, y) = I2(x, y)/3 + I\_3(x, y)/3,$$

$$\ldots$$

$$I(x, y) = IN(x, y) = IN - 1(x, y)/N + I\_N(x, y)/N$$

Furthermore, in the bright remain mode, the following equations are satisfied:

$$I2(x, y) = \max(I\_1(x, y), I\_2(x, y)),$$

$$I3(x, y) = \max(I2(x, y), I\_3(x, y)),$$

$$\ldots$$

$$I(x, y) = IN(x, y) = \max(IN - 1(x, y), I\_N(x, y))$$

Moreover, in the dark remain mode, the following equations are satisfied:

$$I2(x, y) = \min(I\_1(x, y), I\_2(x, y)),$$

$$I3(x, y) = \min(I2(x, y), I\_3(x, y)),$$

$$I(x, y) = IN(x, y) = \min(IN-1(x, y), I\_N(x, y))$$

The method of the combining processing is not limited to the method described above. As the above-described equations, for example, the "N" images may be simultaneously combined.

In the addition mode and the addition averaging mode, the image data (I(x, y), which is the combined raw data) on which the combining processing has been completed from I_1 to I_N is output as a combined output image to each unit for performing subsequent display and recording. In the bright remain mode and the dark remain mode, as described above, the data acquired by performing the OB clamping processing on the combined raw data by the OB integration unit 104 and the OB clamping unit 105 is output as a combined output image to each subsequent unit.

As described above, according to the present exemplary embodiment, in the shooting mode (bright remain and dark remain) in which the combining processing is performed for selecting the pixels from among a plurality of frames of image data to combine them, the OB clamping is performed on the combined raw data. With this arrangement, problems such as washed-out black and a loss of shadow detail caused by the combining processing can be reduced.

According to the present exemplary embodiment, as the processing requiring the OB clamping (processing for correcting the black level) on a combined image signal, the combining processing in the bright remain mode and the dark remain mode are described. However, since shift of the black level is caused by a loss of a random nature of the black level due to selecting the pixels from among the plurality of image signals and combining them according to a predetermined rule, the method of combining the images according to the present exemplary embodiment is not limited to the above-described method. More specifically, it is effective to perform the processing for correcting the black level on the combined image signal on which the combining processing has been performed for selecting the pixels from among the plurality of frames of the image data to combine them as described in the present exemplary embodiment.

Further, according to the present exemplary embodiment, a configuration of the image capture apparatus is described as an example of the image processing apparatus. However, the present invention is not limited to the image capture apparatus described above. As long as the image processing apparatus acquires each shot image in a state where information about the effective pixel region is associated with that about the OB region, it can perform the OB clamping on each image that is not yet combined, the combining processing described in the present exemplary embodiment, and the OB clamping performed on the combined image.

Further, according to the present exemplary embodiment, to correct the dark level of each image signal and combined image signal, the OB clamping processing using a value of the OB region provided in the image signal is used. However, the present invention is not limited to the OB clamping processing described above. The present invention can be realized by generating the dark image signal that has been shot again with the light blocked after each image signal has been shot, and then subtracting the dark image signal from each image signal, which is referred to as "black subtraction processing". In this case, the dark level correction before the raw data is combined can be performed by subtracting the dark image signal corresponding to each image signal. Similar to the processing performed on the OB region according to the present exemplary embodiment, the dark level correction performed on the combined image signal in the bright remain mode and the dark remain mode can be performed on the dark image signal by applying the same processing as that to be performed on the normal image signal, by combining the image signals by the same method, and then the combined dark image signal acquired is subtracted from the normal combined image signal.

Figure 6:
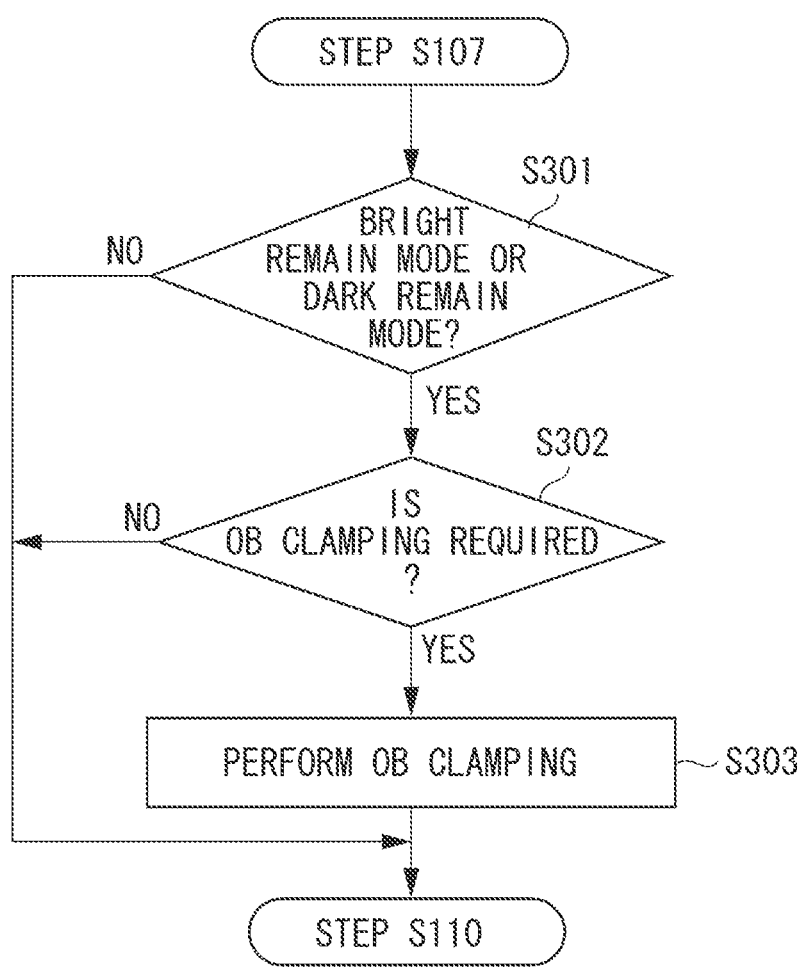
FIG. 6 illustrates a flow of multiple exposure shooting according to a second exemplary embodiment.

According to the first exemplary embodiment, whether to perform the OB clamping after the raw data is combined is determined only depending on the multiple exposure shooting mode. According to a second exemplary embodiment, it is determined also with other shooting conditions. With reference to FIG. 6, the second exemplary embodiment will be described below.

Up to step S107, the same processing as that of the first exemplary embodiment is performed. After the multiple exposure shooting mode is determined in step S301, in step S302, the control unit 112 determines whether to perform the OB clamping on the combined raw data. When the OB clamping is not required (NO in step S302), the processing proceeds to step S110. When the OB clamping is required (YES in step S302), then in step S303, the control unit 112 performs the OB clamping.

With reference to FIG. 7, details of the processing in step S302 will be described below. FIG. 7 is a table illustrating relationships among the ISO sensitivity, an exposure time Tv, a temperature Temp. of the image sensor when the shooting is performed, and necessity of the OB clamping processing. Reference symbol "o" represents a shooting condition that requires the OB clamping, and reference symbol "x" represents a shooting condition that does not require the OB clamping. When even one frame, of "N" frames for multiple exposure shooting, has the shooting condition for requiring the OB clamping, the OB clamping is performed. Only when none of the "N" frames requires the OB clamping, the OB clamping is not performed.

Typically, the higher the ISO sensitivity is, the longer the exposure time is, and the higher the temperature in the image sensor is, the more the random noise increases. However, since the amount of random noise is previously estimated, the table as illustrated in FIG. 7 can be stored in a non-volatile memory (not illustrated) in the image capture apparatus 10.

As described above, according to the present exemplary embodiment, in the shooting mode (bright remain, dark remain) in which the combining processing is performed for selecting the pixels from among the plurality of frames of the image data to combine them, the OB clamping is performed on the combined raw data. With this arrangement, the problems such as washed-out black and a loss of shadow detail caused by the combining processing can be reduced. Further, according to the ISO sensitivity, the exposure time Tv, and the temperature Temp. of the image sensor, when the shooting is performed, the necessity of the OB clamping processing is determined, and thus, the OB clamping can be performed only when it is required, thereby performing the processing at a higher speed.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An image processing apparatus configured to combine a plurality of image signals, the image processing apparatus comprising:
    an acquisition unit configured to acquire the plurality of image signals;
    a combining unit configured to compare signal values of all of the plurality of image signals which are positioned in a corresponding area in an image and select only one image signal among the plurality of image signals for each area in the image according to a predetermined rule, to generate a combined image signal;
    a correction unit configured to correct a black level of each of the plurality of image signals yet to be combined and correct a black level of the combined image signal generated by the combining unit;
    a memory configured to store a table indicating whether correction of the black level is performed on the combined image signal in accordance with a shooting condition; and
    a control unit configured to refer to the table stored in the memory and control correction of the black level for the combined image signal generated by the combining unit, based on a shooting condition at the time when the plurality of image signals is acquired.

2. The image processing apparatus according to claim 1, wherein the combining unit is configured to select an image signal having a maximum signal value among the plurality of image signals for each area in the image, the black level of which has been corrected by the first correction unit, to generate the combined image signal.

3. The image processing apparatus according to claim 1, wherein the combining unit is configured to select an image signal having a minimum signal value among the plurality of image signals for each area in the image, the black level of which has been corrected by the first correction unit, to generate the combined image signal.

4. The image processing apparatus according to claim 1, further comprising a processing unit configured to perform at least one of white balance correction and shading correction on the plurality of image signals, the black level of which has been corrected by the first correction unit,
    wherein the combining unit is configured to generate the combined image signal from the plurality of image signals processed by the processing unit.

5. The image processing apparatus according to claim 1, wherein the combining unit is able to generate the combined image signal by adding or adding and averaging, for each area in the image, the plurality of image signals, the black level of which has been corrected by the first correction unit, and, the second correction unit does not correct the black level of the combined image signal generated by the combining unit.

6. The image processing apparatus according to claim 1, further comprising a black level calculation unit configured to calculate the black level from an image signal in a predetermined light-blocked region on an image sensor used for capturing the plurality of images,
    wherein the first correction unit and the second correction unit are configured to perform correction of the black level based on the black level calculated by the black level calculation unit.

7. An image capture apparatus configured to combine a plurality of image signals, the image processing apparatus comprising:
    an image capture unit configured to output the plurality of image signals;
    a combining unit configured to compare signal values of all of the plurality of image signals which are positioned in a corresponding area in an image and select only one image signal among the plurality of image signals for each area in the image according to a predetermined rule, to generate a combined image signal;
    a correction unit configured to correct a black level of each of the plurality of image signals yet to be combined and correct a black level of the combined image signal generated by the combining unit;
    a memory configured to store a table indicating whether correction of the black level is performed on the combined image signal in accordance with a shooting condition; and
    a control unit configured to refer to the table stored in the memory and control correction of the black level for the combined image signal generated by the combining unit, based on a shooting condition at the time when the plurality of image signals is acquired.

8. An image processing method for combining a plurality of image signals, the image processing method comprising:
    comparing signal values of all of the plurality of image signals which are positioned in a corresponding area in an image,
    selecting only one image signal among the plurality of image signals for each area in the image according to a predetermined rule, to generate a combined image signal;
    correcting a black level of each of the plurality of image signals yet to be combined and correct a black level of the combined image signal generated;
    storing a table indicating whether correction of the black level is performed on the combined image signal in accordance with a shooting condition; and
    controlling, to refer to the table stored in a memory and controlling correction of the black level for the combined image signal generated, based on a shooting condition at the time when the plurality of image signals is acquired.

9. The image processing method according to claim 8, wherein
    in the selecting, an image signal having a maximum signal value among the plurality of image signals is selected for each area in the image, the black level of which has been corrected, to generate the combined image signal.

10. The image processing method according to claim 8, wherein
    in the selecting, an image signal having a minimum signal value among the plurality of image signals is selected for each area in the image, the black level of which has been corrected, to generate the combined image signal.

11. The image processing apparatus according to claim 1, wherein the shooting condition relates to an amount of random noise occurring in the plurality of image signals.

12. The image processing apparatus according to claim 11, wherein the shooting condition includes at least one of international organization for standardization (ISO) sensitivity, an exposure time, and a temperature of an imaging sensor which acquires the plurality of image signals.

* * * * *